April 15, 1969  D. J. GARDNER  3,439,322
VEHICLE BRAKE FLUID PRESSURE MONITOR SYSTEM
Filed April 6, 1966
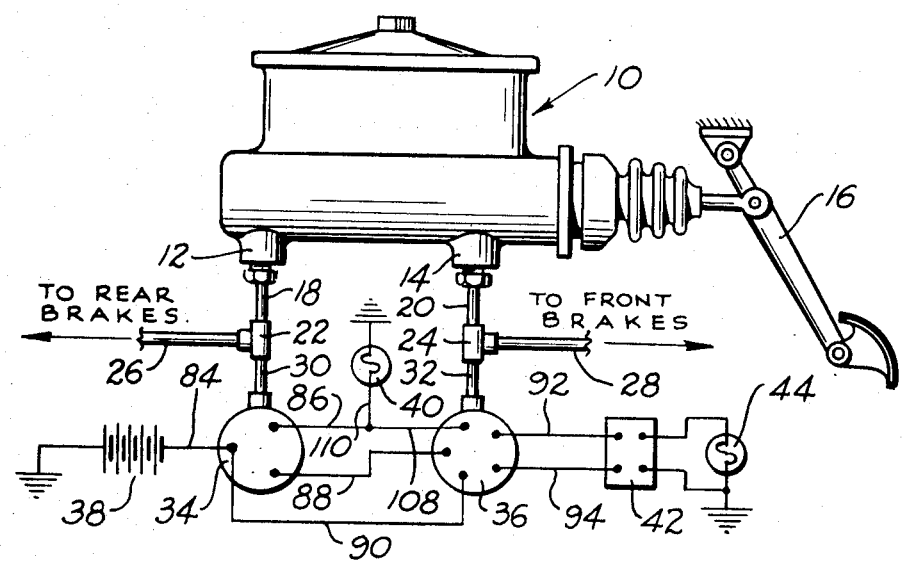
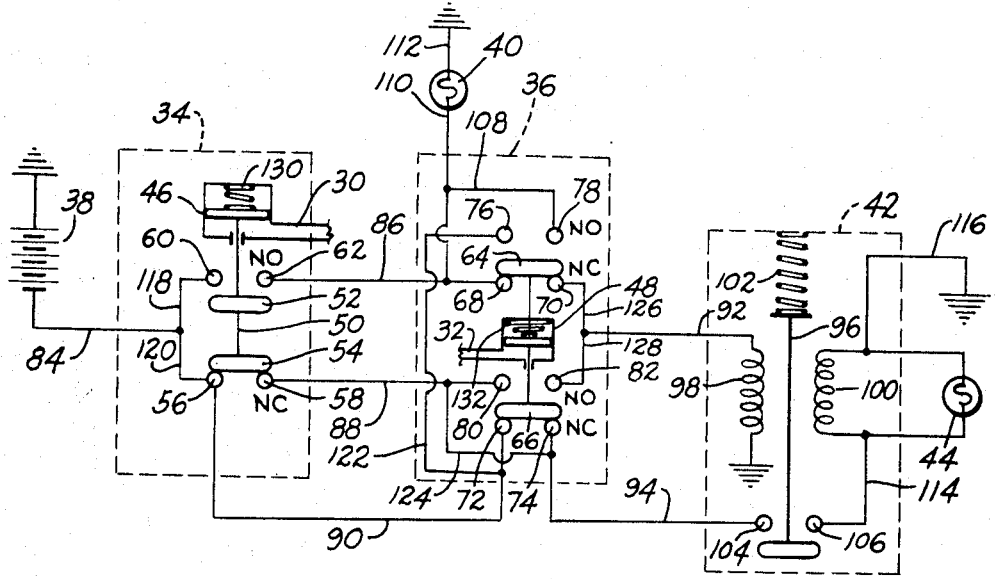
INVENTOR.
DELBERT J. GARDNER.
BY
*Richard H. Geib*
ATTORNEY.

United States Patent Office 3,439,322
Patented Apr. 15, 1969

3,439,322
VEHICLE BRAKE FLUID PRESSURE MONITOR SYSTEM
Delbert J. Gardner, South Bend, Ind., assignor to Bendix Products Automotive, South Bend, Ind., a corporation of Delaware
Filed Apr. 6, 1966, Ser. No. 540,654
Int. Cl. B60q 9/00
U.S. Cl. 340—52          7 Claims This invention relates to improvements in hydraulic controlling systems, such as may be used in connection with vehicle brakes for hydraulic controlling mechanisms generally, and more particularly to safety brake systems including split master cylinders with means for detecting failure of the front or rear wheel brakes.

In more detail, a particular embodiment which has been visualized thus far for the present invention concerns a hydraulic safety brake system and the like having a dual master cylinder with twin hydraulic working chambers. One of the working chambers communicates with a conduit connected to the front wheel brakes, while the other working chamber is communicated with a conduit connected to the rear wheel brakes. Such a system provides independent pressures so that upon a failure in either the front or rear brakes the other intact system will be available for braking the vehicle.

However, with such split system type master cylinders it is quite possible to be operating for some time if a portion thereof failed. Therefore, it is a principal object of this invention to provide a means for detecting a failure in any of the portions of a hydraulic system.

It is another object of this invention to provide a means for testing the indicating system each time the master cylinder is operated.

A still further object of this invention is to provide an indicating means for a split system master cylinder which will be actuated upon loss of pressure, i.e., failure in either section of the system, which actuation will be maintained when the brake pedal is released.

Still yet another object of this invention is to provide an indicating means which will be automatically reset upon the repair, adjusting or bleeding of the system after a failure indication has been provided.

A final, more detailed, object of this invention is to provide a failure indicating means and a pressure indicating means, which pressure indicating means is operable when the system is normal or even with a failure in one or the other of the sections thereof.

Other objects and advantages of this invention will appear to those skilled in the art to which it relates from the following description of the drawings in which:

FIGURE 1 is a schematic arrangement of an indicating means in accordance with the principles of my invention as it may be connected to a split or dual master cylinder for a vehicle braking system; and FIGURE 2 is an electrical circuit diagram in accordance with the principles of my invention.

With reference to FIGURE 1, there is shown a master cylinder 10 that has dual hydraulic pressure outlets 12 and 14 for supplying hydraulic pressure to the rear brakes and to the front brakes, respectively. The master cylinder is affixed to surrounding vehicle structure (not shown) and arranged to be operated by a brake pedal 16 within the passenger compartment of a vehicle. Pressures from the working chamber ports 12 and 14 is communicated via branch conduits 18 and 20 to T fittings 22 and 24 wherefrom it is directed to conduits 26 and 28 respectively connected to the rear wheel brakes and the front wheel brakes. From the T fittings 22 and 24 there is also connected conduits 30 and 32 leading to pressure responsive switches 34 and 36.

An electrical power source such as a vehicle battery 38 is connected to the pressure responsive switches 34 and 36 and upon actuation of these switches serves to illuminate a stoplight 40. In addition, as will be further explained with regard to FIGURE 2, the switches 34 and 36 are in series connection between the power source 38 and a failure indicating relay means 42 which controls a failure indicating device 44 such as a light or buzzer, that may be installed in the dash of the vehicle so that it is readily observable by the operator thereof.

As seen in FIGURE 2, the switches are shown in schematic block to include actuators 46 and 48 responsive to the hydraulic pressures in the conduits 30 and 32, respectively. With regard to the actuator 46, it is linked to a switching element 50 having dual switch plates 52 and 54 operatively arranged between normally closing contacts formed by poles 56 and 58 and normally open contacts formed by poles 60 and 62.

Actuator 48 controls dual switching plates 64 and 66. The plates 64 and 66 are arranged to normally close switch contacts formed by poles 68 and 70 plus 72 and 74, respectively. As with the switching element 50, the plates 64 and 66 are arranged to be reciprocated to open the normally closed contacts and close the normally open contacts comprising poles 76 and 78 plus 80 and 82, whenever a pressure is communicated to conduit 32 to operate the actuator 48. Referring back to FIGURE 1, the switches 34 and 36 are provided with terminals to which are connected electrical leads 84, 86, 88, 90, 92 and 94 for connecting the power source, switches and relay in a series circuit.

The relay 42 comprises a switch element 96 positioned between an actuating coil 98 and a holding coil 100 so that in absence of electrical current to these coils a spring 102 will position the element 96 to open a set of contacts formed by switching poles 104 and 106.

Another electrical lead 108 from the switch 36 is connected to a lead 110 to which is also connected the lead 86 from the switch 34, which lead 110 is connected to the bulb 40. The lead 108 is connected internally of the switch 36 to the pole 78; whereas the lead 86 is connected internally of the switch 34 to the pole 62 of the respective set of contacts for the switches. The bulb 40 is also connected to a lead 112 that is grounded for completing the circuit whenever the switch plate 52 or the switch plate 64 closes the contacts 60, 62 or 76, 78 due to pressures in either or both conduits 30 or 32.

The failure indicating light 44 is connected to the holding coil 100 that is in turn connected to leads 114 and 116 respectively connected to pole 106 and a ground for completing the circuit to the holding coil 100 and bulb 44 whenever the switch element 96 closes the poles 104 and 106.

The lead 84 from the power source 38 is provided with two branches 118 and 120 within the switch 34 that connects to the poles 60 and 56, respectively, and in order to complete the wiring diagram the internal arrangement of the switch 36 includes a lead 122 connecting poles 76 and 72, a lead 124 connecting poles 80 and 74, and branch leads 126 and 128 connecting poles 70 and 82 to the lead 92. Finally, in order to complete the construction, the actuating coil 98 is communicated to the ground to complete the circuit thereto whenever it is desired to actuate same.

In operation, the operator of the vehicle will depress the brake pedal 16 developing pressures for outlets 12 and 14 which will be communicated via conduits 30 and 32 to the actuators 46 and 48. The actuator 46 is provided with a light spring 130; whereas the actuator 48 is provided with a heavy spring 132 so that the pressure in line 30 will operate the switching element 50 prior to the operation of the switching element in switch 36. In this regard it should be noted that the choice of hydraulic switches could be such as to provide switches of different commercial tolerances so that switch 34 will precede switch 36 in actuation without the need of utilizing the differential rate springs as abovementioned. In either event, as the switching element 50 closes the contacts formed by poles 60 and 62, the power source 38 is communicated to the bulb 40 and the actuating coil 98 so that the switching element 96 closes the contacts 104 and 106 to also light the bulb 44 and actuate the holding coil 100. As the pressure builds up in the actuator 48 the switch plates 64 and 66 are moved to close contacts 76, 78 and 80, 82 opening the circuit to the actuating coil 98 and the holding coil 100 as well as the bulb 44 so that the switching element 96 is returned by spring 102 to its normal position whereby the poles 104 and 106 are open; whereas the circuit to the bulb 40 is in no way changed.

It will be thus seen that if there is a failure in the front brake system, the switch plates 64 and 66 will not be reciprocated onto the contacts 76, 78 and 80, 82. In this situation the brake failure bulb 44 will be lit and will remain lit because of the failure of the plates 64 and 66 to brake the circuit from the power source 38 to the holding coil 100. It should also be noted that in the event of a failure to the rear brake system and the consequent failure of switch element 50 to move from the poles 56, 58 to the poles 60, 62 of the switch 34 that the translation of the plate 66 onto the poles 80, 82 will complete the circuit to the actuating coil 98 and the lead 124 will complete the circuit to the holding coil 100 so that the failure indicating light 44 will remain on as with the failure in the front brake system. With such an electrical arrangement as this, it should be noted that upon repair of the failed portion of the braking system, the actuation of the brake pedal 16 will actuate both of the switches 34 and 36 to automatically rest the failure indicating circuitry. The stoplight 40, on the other hand, is excited by switch 34 that actuates first, and excitment continues after both switches 34 and 36 are actuated and until release of the switch 34, which releases at the lowest pressure.

I claim:
1. An indicating means for a vehicle brake system having a split or dual type master cylinder, which means comprises:
   an electrical power source;
   a first electrical lead from said power source;
   a first set of normally closed contacts having one pole connected to said first electrical lead from said power source;
   a first set of normally open contacts having one pole connected to said first lead from said electrical power source;
   a dual element switch operatively arranged between said normally closed and said normally open contacts and operatively connected to said split system master cylinder so as to be operated by pressure developed thereby to open said normally closed contacts and close said normally open contacts;
   a second electrical lead connected to the other pole of said normally closed contacts;
   a third electrical lead connected to the other pole of said normally open contacts;
   a fourth electrical lead connected to the pole of said normally open contacts connected to said power source;
   a fifth electrical lead connected to said pole of said normally closed contacts that is connected to said power source;
   a second set of normally closed contacts having a pole thereof connected to said first electrical lead from said first set of normally closed contacts at the pole thereof connected to said power source;
   a second set of normally open contacts having a pole thereof connected to the second electrical lead from the other pole of said first set of normally closed contacts;
   a third set of normally closed contacts having a pole thereof connected to the third electrical lead from the pole of said normally open contacts;
   a third set of normally open contacts having a pole thereof connected to the pole of said first normally open contacts that is connected to the electrical power source;
   a second pressure responsive switch having dual elements, one of which is located between said second normally closed contacts and said second normally open contacts and the other of which is located between said third set of normally closed contacts and said third set of normally open contacts which pressure responsive switch is operated by another pressure developed by said master cylinder independent of said first pressure operating said first pressure responsive switch means;
   a sixth electrical lead from the other pole of said second normally closed contacts;
   a seventh electrical lead operatively connected to the other pole of said second normally open contacts and said third normally closed contacts;
   an eighth electrical lead from the other pole of said third normally open contacts;
   a ninth electrical lead connected to said third electrical lead and said eighth electrical lead;
   a tenth electrical lead connected to said second electrical lead and said sixth electrical lead;
   an actuating coil connected to said seventh electrical lead;
   a fourth set of normally open contacts having one pole thereof connected to said sixth electrical lead and another pole thereof connected to an eleventh electrical lead;
   an electromagnetically operated switch having an element adapted to close the contacts of said fourth set of normally open contacts;
   a holding coil connected to said eleventh electrical lead;
   a twelfth electrical lead connected to said holding coil and to said electrical power source;
   a first indicating means connected to said eleventh and twelfth electrical leads; and
   a second indicating means connected to said ninth electrical lead.

2. In combination with an electrical power source and a split master cylinder, an electrical indicating system comprising:
   a first pressure responsive switch means including a set of normally open contacts and a set of normally closed contacts with a switching element for closing the open contacts and opening the closed contacts in response to a pressure from said split master cylinder;
   a second pressure responsive switch means having two sets of normally open contacts and two sets of normally closed contacts with a switch element for simultaneously opening the closed contacts of each set as it closes the open contacts of each set in accordance with a second pressure developed by said master cylinder, one set of the normally closed contacts operatively connected to the set of normally closed contacts of said first pressure responsive means and the other set of normally closed contacts being operatively connected to said normally open contacts of said first pressure responsive means;
   a relay including an actuating coil and a holding coil for a magnetically sensitive switch element to control a normally open set of contacts which have one pole thereof connected to said one set of normally closed contacts of said second pressure responsive switch means; and
   an indicating device connected to the other pole of said set of contacts in said relay to be actuated by said magnetically sensitive switch element.

3. In a vehicle brake system, a means to warn a vehicle operator of a failure in one or both hydraulic sides of a split system master cylinder, said means comprising:
- a failure indicating device;
- a relay operatively connecting said failure indicating device to an electrical power source, said relay having an actuating coil and a holding coil for sequentially actuating and holding the actuation of said failure indicating device; and
- a switch means operatively connected to said master cylinder and adapted to control the connection of the power source to said relay, said switch means including first and second switches responsive each to an independent pressure from said master cylinder for actuating said actuating and holding coils each time said master cylinder is operated, said first and second switches having contacts arranged to release said actuating and holding coils whenever both are moved by the hydraulic pressures of said master cylinder.

4. In a vehicle brake system according to claim 3 and further comprising:
- a pressure indicating device connected to said switch means to be actuated by each of said switches independently of the other.

5. In a vehicle brake system according to claim 4 wherein said failure indicating device and said pressure indicating device are characterized as lights.

6. A vehicle brake system according to claim 5 wherein said failure indicating device and said pressure indicating device may be characterized as electrically operated buzzers.

7. For use in a system having multiple hydraulic pressures, a means to indicate development, and failure, of one or more of the hydraulic pressures, said means comprising:
- a first pressure responsive switch operatively connected to one hydraulic pressure;
- a second pressure responsive switch operatively connected to another hydraulic pressure;
- a solenoid operated switch operatively connected to said first pressure responsive switch to be closed thereby, and operatively connected to said second switch to be open thereby in a sequential manner;
- a holding coil actuated by said solenoid switch, said holding coil being operatively connected to a power source thereby whenever said first switch or second switch is inoperative to hold the actuation of said solenoid switch;
- a pressure indicating means operatively connected to both said first switch and said second switch; and
- a failure indicating means operatively connected to said holding coil to be actuated whenever it is receiving power from said power source.

References Cited

UNITED STATES PATENTS 2,046,316  7/1936  Bentz _____ 340—52 XR

ALVIN H. WARING, *Primary Examiner.*

U.S. Cl. X.R.

200—81.4; 340—69